F. J. RABBETH.
DEVICE FOR ATTACHING FISH LINES.
APPLICATION FILED FEB. 12, 1908.
1,004,198.  Patented Sept. 26, 1911.
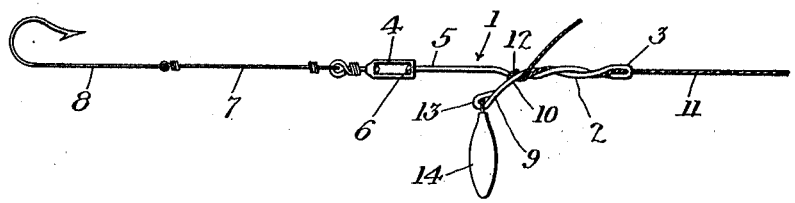
Witnesses:
Lute S. Otter
I. D. Thornburgh.
Inventor:
Francis J. Rabbeth,
by Townsend Hour & Hackley
attys.

UNITED STATES PATENT OFFICE.

FRANCIS J. RABBETH, OF REDLANDS, CALIFORNIA.

DEVICE FOR ATTACHING FISH-LINES.

1,004,198.　　　　　Specification of Letters Patent.　　Patented Sept. 26, 1911.

Application filed February 12, 1908. Serial No. 415,464.

*To all whom it may concern:*

Be it known that I, FRANCIS J. RABBETH, a citizen of the United States, residing at Redlands, in the county of San Bernardino and State of California, have invented a new and useful Device for Attaching Fish-Lines, of which the following is a specification.

My invention particularly relates to means for connecting fishing lines to the swivel or leader for bait or lures used in trolling for fish and also includes, in connection therewith, means whereby the line is prevented from twisting or untwisting by the rotation of such lure or bait when being pulled through the water.

I have discovered that a fishing line is much weakened by any short bend given to its fibers while under strain and that such line will invariably break at a knot if equal strain is had at such point as at other points along the line.

The principal object of my invention, therefore, is to provide means whereby the line can be connected at its end to the swivel carrying the leader and bait in such a manner as will allow of the strain of any pull to which the line may be subjected to frictionally contact longitudinally along the body of such connecting means, thereby greatly reducing the strain at the point where the line crosses itself in an abrupt bend, knot or loop.

Another object is to provide means to prevent the line from being injuriously affected by the rotation of the bait or lure.

Another object is to provide means to which a gaff may be hooked to hold or land a large fish when it is not desired to gaff the fish.

The accompanying drawings illustrate my invention and consists of a side elevation of a device embodying a form of my invention.

Referring more particularly to the drawings which are for illustrative purposes only and, therefore, are not drawn to any particular scale, I designate the body or main portion of my attaching device, which is preferably formed of metal, as wire, doubled and twisted upon itself to form a shank or spiral portion 2 and eye or loop 3. A swivel 4 is connected to the end 5 of the body portion of the device by means of a head or enlargement 6 formed thereon. To the swivel 4 is secured a snood 7 having a hook 8 secured to the outer end thereof. The end 9 of the wire forming the device is extended at an angle to the body portion of the device from the rear end of the spiral portion 2 to form a shoulder 10 for fastening the line thereto. The line 11 is secured to the device by passing the end of the line through the loop 3, thence around the spiral portion 2 to the rear end thereof where the end of the line is given a turn or half hitch 12 around the body and in engagement with the shoulder 10. In this manner the pull upon the line is substantially axially or in a straight line with the body and the strain is partly taken up by the frictional engagement of the line with the spiral portion of the body, so that where the line crosses over the end 9 to bind it against the body, the strain is not sufficient to cause the line to be broken at that point. As the spiral terminates in the loop and extends back to the shoulder the line engages with the attachment on such a gradual curve that it is no more liable to break at that point than anywhere else, which is not the case where it makes a bend or passes over a shoulder of any kind. Frictional engagement of the line with the body and especially when impeded with the spiral is so great that the strain upon it cannot possibly cause the line to break where it passes over the free end 9. The depending end 9 forms a weight so as to prevent rotation of the attachment and consequent untwisting of the line and is provided with a loop or eye 13 to which may be attached a weight or sinker 14, if it is so desired. The depending portion or end 9 also may be employed as a means for assisting in landing the fish by engaging the same with a gaff, particularly when it is desired to land the fish without gaffing the fish.

By the use of my attachment the rotary movement of the bait or lure is absolutely prevented from being transmitted to the line and thereby the strength of the line is unimpaired by a change or variation in its twist from the normal, which has been so adjusted by the manufacturer as to secure the greatest strength for that particular kind and style of line.

In addition to this I have actually demonstrated that a line attached by winding it spirally around a body and fastening its end by a loop or half hitch will stand many more pounds strain than where the portion of the line bearing the direct strain passes directly over another portion, or turn of the line, as in the ordinary knot or loop. Where the line is embedded in a groove or spiral, it is evident that the frictional engagement therewith is much greater than where the body is plain and, therefore, I prefer to construct my attachment by doubling and twisting the wire upon itself to form one end and connecting the bait or lure to the other end in any desired manner, and weighting the attachment by a sinker secured thereto.

Having described my invention, I claim:—

1. A device for attaching fishing lines comprising a spirally grooved body with an eye at its forward end, a swivel at the rear end thereof adapted to have a bait or lure attached thereto, and a depending portion at the rear end of the spiral, said spiral portion terminating at a distance from the rear end and being adapted to have a line embedded therein and secured at said depending portion.

2. A device for attaching fishing lines comprising a spirally grooved body with an eye at its forward end, means for attaching a bait or lure to said body, and a depending portion at the rear end of the spiral portion, said spiral portion terminating at a distance from the rear end and being adapted to have a line embedded therein and secured at said depending portion.

In testimony whereof, I have hereunto set my hand at Redlands, California, this fifth day of February 1908.

FRANCIS J. RABBETH.

In presence of—
L. R. PATTY,
B. A. LANE.

Copies of this patent may be obtained for five cents each, by addressing the "Commissioner of Patents, Washington, D. C."